US012224931B2

(12) United States Patent
Jain et al.

(10) Patent No.: US 12,224,931 B2
(45) Date of Patent: Feb. 11, 2025

(54) DATA SOVEREIGNTY AND SERVICE INSERTION IN MULTISITE NETWORK FABRIC

(71) Applicant: Cisco Technology, Inc., San Jose, CA (US)

(72) Inventors: Prakash C. Jain, Fremont, CA (US); Vinay Saini, Bangalore (IN); Sanjay Kumar Hooda, Pleasanton, CA (US)

(73) Assignee: Cisco Technology, Inc., San Jose, CA (US)

( * ) Notice: Subject to any disclaimer, the term of this patent is extended or adjusted under 35 U.S.C. 154(b) by 344 days.

(21) Appl. No.: 17/897,634

(22) Filed: Aug. 29, 2022

(65) Prior Publication Data

US 2024/0073127 A1   Feb. 29, 2024

(51) Int. Cl.
  *H04L 45/00* (2022.01)
  *H04L 45/12* (2022.01)

(52) U.S. Cl.
  CPC ............ *H04L 45/38* (2013.01); *H04L 45/126* (2013.01); *H04L 45/22* (2013.01)

(58) Field of Classification Search
  CPC ....... H04L 45/38; H04L 45/126; H04L 45/22; H04L 41/0806; H04L 41/0895; H04L 45/76; H04L 41/0894; H04L 45/04; H04L 45/64; H04L 63/20
  See application file for complete search history.

(56) References Cited

U.S. PATENT DOCUMENTS

| | | | |
|---|---|---|---|
| 9,660,895 B1 * | 5/2017 | Bennett | ................. H04W 40/20 |
| 10,826,775 B1 | 11/2020 | Moreno et al. | |
| 11,159,419 B1 | 10/2021 | Roersma et al. | |
| 11,245,614 B1 * | 2/2022 | Backes | ............... H04L 12/4641 |
| 2017/0134265 A1 | 5/2017 | Haddad et al. | |
| 2019/0182157 A1 * | 6/2019 | Barnes | ................ G06F 21/6218 |
| 2020/0382519 A1 | 12/2020 | Barton | |
| 2021/0075767 A1 | 3/2021 | Jain et al. | |
| 2021/0352108 A1 | 11/2021 | Rotkop | |

(Continued)

OTHER PUBLICATIONS

PCT Search Report and Written Opinion mailed Dec. 5, 2023 for PCT Application No. PCT/US2023/031298, 26 pages.

*Primary Examiner* — Joseph P Hirl
*Assistant Examiner* — Thomas A Gyorfi
(74) *Attorney, Agent, or Firm* — Lee & Hayes, P.C.

(57) ABSTRACT

Techniques for a Software-Defined Networking (SDN) controller associated with a multisite network to implement jurisdictional data sovereignty polices in a multisite network, route network traffic flows between user sites and destination services over one or more provider sites, and/or perform a routing operation on the network traffic flow(s) based on the jurisdictional data sovereignty policies. The jurisdictional data sovereignty polices may be implemented using destination group tags (DGTs) and/or source group tags (SGTs). A secure access service edge (SASE) associated with the network controller may generate, store, and distribute the DGTs to provider sites and/or the SGTs to user sites. Based on the SGT and/or DGT associated with a network traffic flow, one or more services may be applied to the network traffic flow, and the network traffic flow may be routed through a particular region of a software-defined access (SDA) transit.

20 Claims, 5 Drawing Sheets

(56) References Cited

U.S. PATENT DOCUMENTS

| | | |
|---|---|---|
| 2022/0029856 A1 | 1/2022 | Lin et al. |
| 2022/0103597 A1 | 3/2022 | Gobena et al. |
| 2022/0272033 A1 | 8/2022 | Jain et al. |
| 2022/0417287 A1* | 12/2022 | Joshi .................. H04L 63/0236 |
| 2023/0020154 A1* | 1/2023 | Nainar ................ H04L 47/2441 |
| 2023/0127962 A1* | 4/2023 | Narayan ................ H04L 45/50 370/254 |
| 2023/0179974 A1* | 6/2023 | Gadalin ................ H04W 40/34 455/418 |

* cited by examiner

DATA SOVEREIGNTY AND SERVICE INSERTION IN MULTISITE NETWORK FABRIC

TECHNICAL FIELD

The present disclosure relates generally to implementing jurisdictional data sovereignty policies providing region specific data sovereignty, regional breakouts, and service insertion within multisite networks.

BACKGROUND

Service providers offer computing-based services, or solutions, to provide users with access to computing resources to fulfill users' computing resource needs without having to invent in and maintain computing infrastructure required to implement the services. These service providers often maintain networks of data centers which house servers, routers, and other devices that provide computing resources to users such as compute resources, networking resources, storage resources, database resources, application resources, security resources, and so forth. The solutions offered by service providers may include a wide range of services that may be fine-tuned to meet a user's needs. Since user sites generally don't have all of these solutions locally, solutions may be accessible to users via service borders of provider sites which may be provisioned across site boundaries in different sites. In some instances, such as, for example, cloud or internet services accessible via service borders, a region-specific breakout may be required for user sites. However, in current Software-Defined Access (SDA) fabric networks, region-specific access restrictions are not currently possible.

For example, in SDA and Software-Defined Networking (SDN) multisite networks, restricting access only to the region is difficult in fabric/overlay networks with transit site, especially in networks using on-demand protocol like Location Identifier Separation Protocol (LISP) or the like, as there is no concept of region given that segmentation is based virtual networking (VN) or source group tag (SGT). This is because overlay tunnels to service borders are formed using map-server and/or a centralized control plane within transit site and not based on parameters, such as, for example, distance within a given region. Therefore, in SDA and/or SDN networks today (or other networks that are based on on-demand protocols), it is not possible to provide service and backup paths via service borders within the same region while paths are available via different service borders in different regions registered within the same domain of a transit site.

Additionally, the complexity of this issue increases if service borders within transit site themselves are changing dynamically, such as, for example, due to availability of services, load balancing across many service borders due to datacenter server load balancing, hybrid services, multipath link congestions, quality of service (QOS) or bandwidth requirements, data loss, and the like. Thus, new techniques may be required in multisite deployments to allow user sites to choose a service border of a provider site based on its proximity, location, and/or any other dynamic parameter among multiple provider sites and/or service borders while remaining within its own region and to redirect traffic to that border to apply a service and/or a chain of services.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DESCRIPTION OF EXAMPLE EMBODIMENTS

Overview

This disclosure describes method(s) for using a Software-Defined-Networking (SDN) controller to implement jurisdictional data sovereignty policies to route network traffic between user sites and destination services over one or more provider sites. The method includes receiving site-specific data sovereignty policies for individual ones of provider sites indicating how to route network traffic based on the destination services associated with network traffic and geographic regions in which the provider sites are located. Additionally, or alternatively, the method includes defining destination group tags (DGTs) that indicate how the provider sites are to route the network traffic based at least in part on the geographic regions in which the provider sites are located and the destination services to which the network traffic is destined. In some examples, the DGTs may be defined using the site-specific data sovereignty policies. Additionally, or alternatively, the method includes obtaining source group tags (SGTs) indicating how to route the network traffic sent from different sources in the user sites and toward the destination services. Additionally, or alternatively, the method includes receiving, at a border router associated with a user site of the user sites, a network traffic flow originating from a user device in the user site. Additionally, or alternatively, the method includes communicating an indication of the network traffic flow. In some examples, the indication of the network traffic flow may be communicated from the border router and to the SDN controller. Additionally, or alternatively, the method includes receiving a DGT associated with the destination service of the network traffic flow and an SGT associated with the user device in the user site. In some examples, the DGT may be received at the border router and from the SDN controller. Additionally, or alternatively, the method includes determining a routing operation to perform associated with the network traffic flow. In some examples, the routing operation may be based at least in part on the DGT and the SGT. Additionally, or alternatively, the method includes performing the routing operation associated with the network traffic flow.

Additionally, or alternatively, the method includes receiving site-specific data sovereignty policies for individual ones of the provider sites indicating how to route the network traffic based on destination services associated with the network traffic and geographic regions in which the provider sites are located. In some examples, the site-specific data sovereignty policies may be received at a Software-Defined-Networking (SDN) controller configured to implement jurisdictional data sovereignty policies to route network traffic between user sites and destination services over one or more provider sites. Additionally, or alternatively, the method includes defining destination group tags (DGTs) that indicate how the provider sites are to route the network traffic based at least in part on the geographic regions in which the provider sites are located and the destination services to which the network traffic is destined. In some examples, the DGTs may be defined by the SDN controller and/or using the site-specific data sovereignty policies. Additionally, or alternatively, the method includes obtaining source group tags (SGTs) indicating how to route the network traffic sent from different sources in the user sites and toward the destination services. Additionally, or alternatively, the method includes receiving an indication of a network traffic flow originating from a user device in the user site. In some examples, the indication may be received at the SDN controller and from a border router associated with a user site of the user sites. Additionally, or alternatively, the method includes Additionally, or alternatively, the method includes sending a DGT associated with the destination service of the network traffic flow and an SGT associated with the user device in the user site. In some examples, the DGT may be sent to the border router and from the SDN controller. Additionally, or alternatively, the method includes receiving an indication of a routing operation to perform associated with the network traffic flow, wherein the routing operation is based at least in part on the DGT and the SGT. In some examples, the indication of the routing operation may be received from the border router and at the SDN controller. Additionally, or alternatively, the method includes performing the routing operation associated with the network traffic flow.

Additionally, the techniques described herein may be performed by a system and/or device having non-transitory computer-readable media storing computer-executable instructions that, when executed by one or more processors, performs the method described above.

Example Embodiments

This disclosure describes techniques for a Software-Defined Networking (SDN) controller, associated with computing resource network such as, for example, a multisite fabric network, to implement jurisdictional data sovereignty policies for routing networking traffic between user sites of the multisite fabric network and destination services provided by one or more provider sites of the multisite fabric network. In some examples, the computing resource network may include a Software-Defined Access (SDA) transit comprising one or more provider sites having at least one provider border, one or more user sites having at least one user border, and a control plane for routing network traffic between a user device of a user site and a service provided by one or more provider sites. The SDA transit may be controlled via the SDN controller. Additionally, or alternatively, the SDA transit may be provisioned across site boundaries, such that, first provider sites of the one or more provider sites and first user sites of the one or more user sites may be located in a first region of the computing resource network and/or second provider sites of the one or more provider sites and second user sites of the one or more user sites may be located in a second region of the computing resource network that is different from the first region. Additionally, or alternatively, the computing resource network may include a secure access service edge (SASE) component configured to maintain (e.g., store, update, identify, distribute, etc.) site-specific data sovereignty breakout policies to provide service insertion and/or service chaining capability when routing network traffic within the SDA transit. In some examples, the SASE component may be configured to distribute destination group tags (DGTs) to each provider border that is specific to the region in which the provider border is provisioned and/or to the service and/or destination provided by the provider site. Additionally, or alternatively, the SASE component may be configured to distribute source group tags (SGTs) to user borders indicating how to route network traffic sent from a respective source (e.g., a user device in a user site) toward destination services (e.g., the provider sites). The SDN controller may be configured to perform routing operations on network traffic flows in the SDA transit based on the SGTs and the DGTs.

Each SGT and/or DGT may correspond to a jurisdictional data sovereignty policy configured as an SGT-DGT based redirection policy. In some examples, a provider site may have a separate DGT for each destination service provided by the provider site. Additionally, or alternatively, a first provider site provisioned in a first region of the SDA transit and providing a first service may have a different DGT than a second provider site provisioned in a second region of the SDA transit and providing the first service. Despite the provider sites both offering the first service, the provider sites are provisioned in separate regions/jurisdictions of the SDA transit and as such are assigned different DGTs. In some examples, a user site may have a single SGT for the user site. Additionally, or alternatively, a separate SGT may be distributed to a user border for each user device connecting to the computing resource network.

As previously described, the network controller, such as, for example, an SDN controller, may be configured to implement jurisdictional data sovereignty policies for routing network traffic in an SDA transit. The SDA transit may include one or more provider borders (e.g., a provider site networking device provisioned at an edge of the SDA transit and/or provider site) associated with provider sites spanning one or more geographic regions, such as, for example, a first geographic region and/or a second geographic region. Additionally, or alternatively, the SDA transit may include one or more user borders (e.g., a user site networking device provisioned at an edge of the SDA transit and/or user site) associated with user sites spanning one or more geographic regions, such as, for example, the first geographic region and/or the second geographic region. The SDA transit may also include a regional firewall configured to perform one or more security services on network traffic flows, associated with a corresponding region of the SDA transit, and destined for one or more destination services.

Additionally, or alternatively, the SDA transit may include a SASE component configured to distribute the data sovereignty policies, by way of group tags (e.g., an SGT and/or a DGT), to the provider borders, the user borders, and/or the network controller. In some examples, the distribution of such tags may be performed when a provider border and/or a user border connects to the SDA transit, and/or in response to a request from a provider border and/or a user border.

Each provider border receives a policy, corresponding to a particular DGT, based on a geographic region associated with the provider site and/or a destination service and/or destination services which the provider site may provide access to (e.g., via a service gateway). When a provider border receives a policy from the SASE component and/or a component thereof, such as, for example a data sovereignty engine (DSE) and/or a identity service engine (ISE), the provider border may cache them and register the group tag and policy with the control plane of the SDA transit. User borders may receive a policy, corresponding to a particular DGT, based on a source requesting access to the destination service. Policies that are to be distributed to a user border may indicate how to route network traffic sent from a particular source in a particular user site and toward one or more destination services. When a user border receives a policy, a map-request is generated to the control plane of the SDA transit for the destination service. The control plane may resolve the service gateway for the user border and apply the policies and/or reply with a DGT corresponding to a policy associated with a provider site hosting the service gateway.

In some examples, the control plane of the SDA transit and/or the SDN controller may be configured to apply the policies corresponding to the SGT and/or the DGT associated with the network traffic flow and cause the SDN controller to perform one or more routing operations on the network traffic flow, such as, for example, routing the network traffic flow to a provider site and/or dropping a packet associated with the network traffic flow. In some examples, the network traffic flow may originate from a user device of a first user site provisioned in a first region of the SDA transit.

In some examples, the SDN controller may receive the network traffic flow from a user border associated with the first user site and route the network traffic flow to a first provider border provisioned in a first provider site of multiple provider sites associated with the SDA transit based on the SGT and/or the DGT associated with the network traffic flow. In some examples, the SDN controller may determine to route the network traffic flow to the first provider border based on the first provider site being provisioned in the first region. Additionally, or alternatively, the first region may include a second provider site, and the SDN controller may determine to route the network traffic flow to the first provider border based on the first provider site having a more favorable proximity to the first user site than the second provider site (e.g., the first provider site is located more proximal to the first user site than the second provider site). Additionally, or alternatively, the SDA transit may include a third provider site of the multiple provider sites provisioned in a second region of the SDA transit. The first region the SDA transit may be associated with a first jurisdiction and/or a first geographic region and the second region of the SDA transit may be associated with a second jurisdiction and/or a second geographic region. In some examples, the SDN controller may determine to route the network traffic flow to the first provider site based on the first geographic region being more favorable than the second geographic region (e.g., the first provider site being associated with the first jurisdiction and/or the first geographic region and the first user site being associated with the first jurisdiction and/or the first geographic region) with respect to the first user site. The first provider site may then route the network traffic flow to the destination service via the corresponding service gateway. Additionally, or alternatively, the first provider site may perform one or more services (e.g., apply a service chain) on the network traffic flow prior to routing the network traffic flow to the destination service(s).

The SDN controller and/or a user border may determine to route a network traffic flow across regions/jurisdictions based on the policy associated with the network traffic flow. For example, the SDN controller may determine that the provider site(s) provisioned in the first region of the SDA transit are unavailable and, based on the SGT and/or the DGT (e.g., the policy) associated with the network traffic flow, may identify a provider site provisioned in the second region of the SDA transit configured to provide the destination service, and may route the network traffic flow from the first user site in the first region to a provider site in the second region to provide access to the destination service. Additionally, or alternatively, the SDN controller may transmit the SGT associated with the user device in the user site and the DGT associated with the destination service to the user border which may determine whether or not to route the network traffic flow to a provider border in a different region based on the SGT and/or the DGT.

The SDN controller and/or a user border may also determine to drop packets associated with the network traffic flow when it is determined that the providers site(s) provisioned in the same region of the SDA transit as the first user site (e.g., the source) are unavailable. For example, the policy (indicated by the SGT and/or the DGT) may be configured such that network traffic flows originating from a particular user site and/or destined for a particular destination service may only be routed through the same region/jurisdiction. As such, the SDN controller may determine to drop packets associated with the network traffic flow. Additionally, or alternatively, the SDN controller may transmit the SGT associated with the user device in the user site and the DGT associated with the destination service to the user border which may determine whether or not to drop the packet based on the SGT and/or the DGT.

As described herein, a computing-based, cloud-based solution and/or service generally include any type of resources implemented by virtualization techniques, such as containers, virtual machines, virtual storage, and so forth. Further, although the techniques described as being implemented in data centers and/or a cloud computing network, the techniques are generally applicable for any network of devices managed by any entity where virtual resources are provisioned. In some instances, the techniques may be performed by a schedulers or orchestrator, and in other examples, various components may be used in a system to perform the techniques described herein. The devices and components by which the techniques are performed herein are a matter of implementation, and the techniques described are not limited to any specific architecture or implementation.

The techniques described herein provide various improvements and efficiencies with respect to enforcing region-specific access restrictions and data sovereignty in multisite SDA/SDN networks. For instance, the techniques described herein may allow for the use of parameters, such as, for example, proximity to a network site, geographic region of a network site, and the like, to determine how to route network traffic flows through an SDA transit. By distributing an SGT associated with a user device in a user site to a user border and a DGT associated with a destination service to a provider border of a provider site provisioned in a region of the SDA transit, the network traffic flow may be mapped to a SGT-DGT redirection policy indicating how the network traffic flow is to be routed through the SDA transit. Region-specific access restrictions may be implemented using such a policy as network traffic flows may be routed between user sites and provider sites provisioned in the same geographic region of the SDA transit. Additionally, by distributing SGTs to user sites and DGTs to provider sites, service insertion and service chaining capabilities may be performed on the network traffic flow. For instance, the provider borders may determine to apply a service and/or a chain of services to a network traffic flow prior to routing the network traffic flow to a destination service based on a DGT.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

Figure 1:
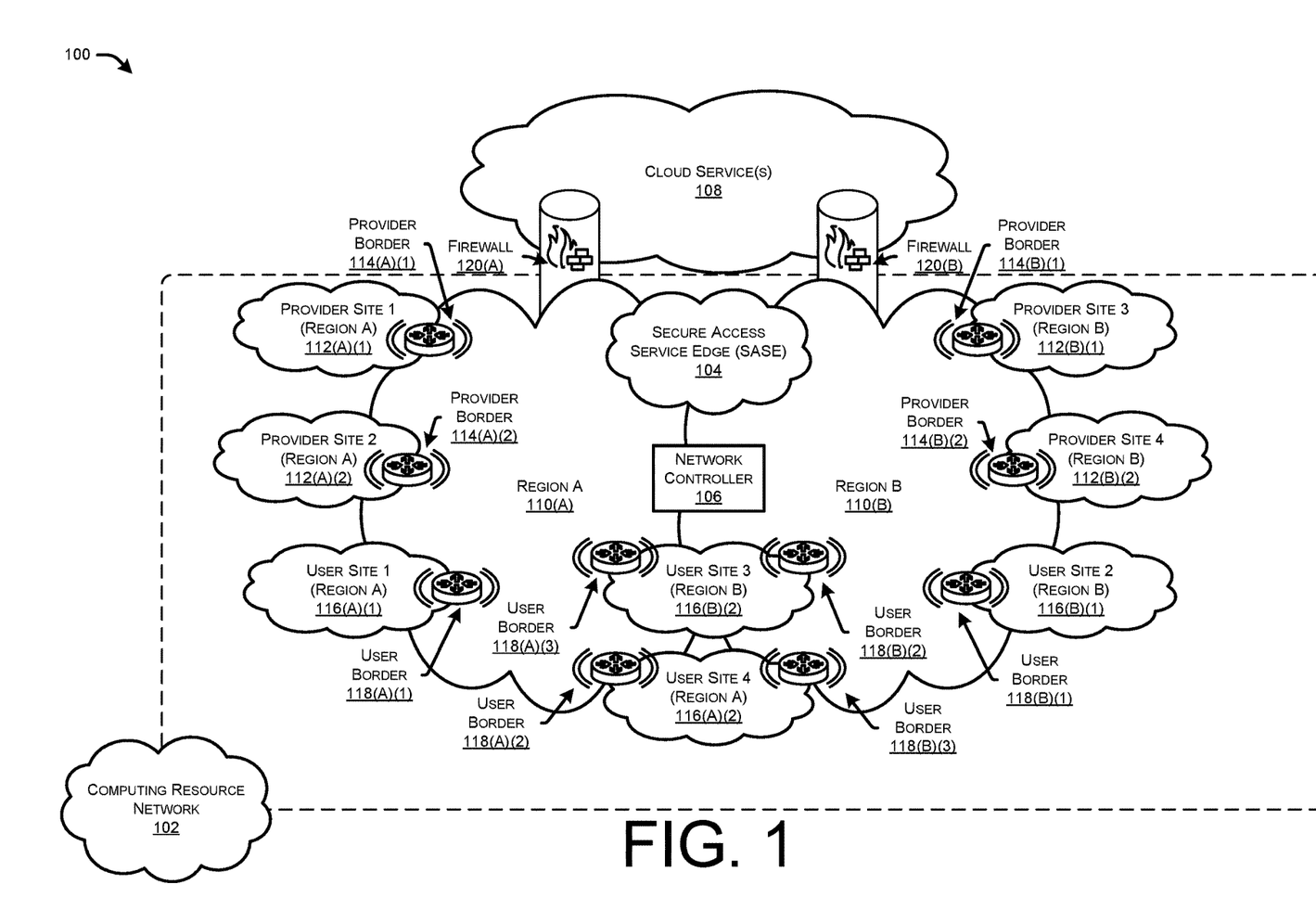
FIG. 1 illustrates a system architecture diagram for a multisite computing resource network including a Secure Access Service Edge (SASE) engine and a network controller configured to implement jurisdictional data sovereignty policies indicating how to route network traffic through a network transit of the computing resource network based on destination services associated with the network traffic and geographic regions of the computing resource network in which provider sites, configured to provide access to the destination services, of the network transit are located.

FIG. 1 illustrates a system architecture diagram 100 for a multisite computing resource network 102 including a Secure Access Service Edge (SASE) engine 104 and a network controller 106 configured to implement jurisdictional data sovereignty policies indicating how to route network traffic through a network transit of the computing resource network 102 based on destination services 108 associated with the network traffic and geographic regions 110 of the computing resource network 102 in which provider sites 112, configured to provide access to the destination services 108, of the network transit are located.

The computing resource network 102 may comprise one or more data centers, provisioned across various geographic regions, that include various networking components, such as, a network controller and/or network switches (also referred to as nodes) operating on physical servers. In some examples, physical server(s) may host one or more virtual machines. Each virtual machine may be configured to execute one of various operations and act as one or more virtual components for the computing resource network 102, such as, for example, computing-based resources. In some examples, the physical server(s) may host any number of virtual machines. In some examples, physical server(s) in the computing resource network 102 may host the various network components of the computing resource network 102, such as, for example, network devices associated with a provider site 112, such as, for example, destination service gateways and/or provider border(s) 114, network devices associated with a user site 116, such as, for example, user devices and/or user border(s) 118, and/or the SASE engine 104.

The computing resource network 102 may include a Software-Defined Access (SDA) transit (illustrated by the clouds within the dashed line) comprising one or more provider sites 112 having at least one provider border 114, one or more user sites 116 having at least one user border 118, and a control plane for routing network traffic between a user device of a user site 116 and a cloud service 108 provided by one or more provider sites 112. The SDA transit may be controlled via the network controller 106 (e.g., an SDN controller).

The SDA transit may be provisioned across site boundaries, such that, first provider sites 112(A) of the one or more provider sites 112 and first user sites 116(A) of the one or more user sites 116 may be located in a first region 110(A) (region A 110(A)) of the computing resource network 102 and/or second provider sites 112(B) of the one or more provider sites 112 and second user sites 116(B) of the one or more user sites 116 may be located in a second region 110(B) (region B 110(B)) of the computing resource network 102 that is different from the first region 110(A). Additionally, or alternatively, the computing resource network 102 may include a secure access service edge (SASE) engine 104 (also referred to herein as a SASE component) configured to maintain (e.g., store, update, identify, distribute, etc.) site-specific data sovereignty breakout policies to provide service insertion and/or service chaining capability when routing network traffic within the SDA transit. In some examples, the distribution of such tags may be performed when a provider border 114 and/or a user border 118 connects to the SDA transit, and/or in response to a request from a provider border 114 and/or a user border 118. In some examples, the SASE component 104 may be configured to distribute destination group tags (DGTs) to each provider border 114. Each provider border 114 may receive a DGT that is be specific to the region 110 in which the provider border 114 is provisioned and/or to the cloud service 108 provided by the provider site 112. Additionally, or alternatively, the SASE component 104 may be configured to distribute source group tags (SGTs) to user borders 118 indicating how to route network traffic sent from a respective source (e.g., a user device in a user site 116) toward destination services 108 (e.g., the provider sites 112). The SDN controller 106 may be configured to perform routing operations on network traffic flows in the SDA transit based on the SGTs and the DGTs.

Additionally, or alternatively, the SDA transit may also include a regional firewall 120 configured to perform one or more security services on network traffic flows, associated with a corresponding region 110 of the SDA transit, and destined for one or more cloud services 108. For example, a first firewall 120(A) may be configured to perform the security services on network traffic flows accessed via service gateways of provider sites 112(A) provisioned in the first region 110(A). Additionally, or alternatively, a second firewall 120(B) may be configured to perform the security services on network traffic flows access via service gateways of provider sites 112(B) provisioned in the second region 110(B).

Each SGT and/or DGT may correspond to a jurisdictional data sovereignty policy configured as an SGT-DGT based redirection policy. In some examples, a provider site 112 may have a separate DGT for each destination service 108 provided by the provider site 112. Additionally, or alternatively, a first provider site 112(A)(1) provisioned in a first region 110(A) of the SDA transit and providing a cloud service 108 may have a different DGT than a second provider site 112(B)(1) provisioned in a second region 110(B) of the SDA transit and providing the cloud service 108. Despite the provider sites 112 both offering the same cloud service 108, the provider sites 112(A)(1), 112(B)(1) are provisioned in separate regions/jurisdictions 110 of the SDA transit and as such are assigned different DGTs. In some examples, a user border 118 may have a single SGT for the user site 116. Additionally, or alternatively, a separate SGT may be distributed to a user border 118 for each user device connecting to the computing resource network 102 via the user site 116.

Each provider border 114 may receive a policy, corresponding to a particular DGT, based on a geographic region 110 associated with the provider site 112 and/or destination cloud service(s) 108 which the provider site 112 may provide access to (e.g., via a service gateway). When a provider border 114 receives a policy from the SASE 104 and/or a component thereof, such as, for example a data sovereignty engine (DSE) and/or a identity service engine (ISE), the provider border 114 may cache them and register the group tag and policy with the control plane of the SDA transit.

User borders 118 may receive a policy, corresponding to a particular DGT, based on a source requesting access to the destination cloud service(s) 108. Policies that are to be distributed to a user border 118 may indicate how to route network traffic sent from a particular source in a particular user site 116 and toward one or more destination cloud services 108. When a user border 118 receives a policy, a map-request is generated to the control plane of the SDA transit for the destination cloud service 108. The control plane may resolve the service gateway for the user border 118 and apply the policies and/or reply with a DGT corresponding to a policy associated with a provider site 112 hosting the corresponding service gateway.

In some examples, the control plane of the SDA transit and/or the SDN controller 106 may be configured to apply the policies corresponding to the SGT and/or the DGT associated with the network traffic flow and cause the SDN controller 106 to perform one or more routing operations on the network traffic flow, such as, for example, routing the network traffic flow to a provider site 112 and/or dropping a packet associated with the network traffic flow.

Take, for example, a network traffic flow originating from a user device of a first user site 116(A)(1) provisioned in a first region 110(A) of the SDA transit. In some examples, the SDN controller 106 may receive the network traffic flow from a user border 118(A)(1) associated with the first user site 116(A)(1) and route the network traffic flow to a first provider border 114(A)(1) provisioned in a first provider site 112(A)(1) of multiple provider sites 112 associated with the first region 110(A) of the SDA transit based on the SGT and/or the DGT associated with the network traffic flow. In some examples, the SDN controller 106 may determine to route the network traffic flow to the first provider border 114(A)(1) based on the first provider site 112(A)(1) being provisioned in the first region 110(A).

Additionally, or alternatively, the first region 110(A) may include a second provider site 112(A)(2), and the SDN controller 106 may determine to route the network traffic flow to a second provider border 114(A)(2) of the second provider site 112(A)(2) based on the second provider site 112(A)(2) having a more favorable proximity to the first user site 116(A)(1) than the first provider site 112(A)(1) (e.g., the second provider site 112(A)(2) is located more proximal to the first user site 116(A)(1) than the first provider site 112(A)(1)). Additionally, or alternatively, the SDA transit may include a third provider site 112(B)(1) of the multiple provider sites 112 provisioned in a second region 110(B) of the SDA transit. The first region 110(A) of the SDA transit may be associated with a first jurisdiction and/or a first geographic region and the second region 110(B) of the SDA transit may be associated with a second jurisdiction and/or a second geographic region. In some examples, the SDN controller 106 may determine to route the network traffic flow to the first provider site 112(A)(1) based on the first geographic region 110(A) being more favorable than the second geographic region 110(B) (e.g., the first provider site 112(A)(1) being associated with the first jurisdiction and/or the first geographic region 110(A) and the first user site 116(A)(1) being associated with the first jurisdiction and/or the first geographic region 110(A)) with respect to the first user site 116(A)(1).

The provider site 112 which the network traffic flow is routed to (e.g., the first provider site 112(A)(1) may then route the network traffic flow to the destination cloud service 108 via the corresponding service gateway. Additionally, or alternatively, the first provider site 112(A)(1) may perform one or more services (e.g., apply a service chain) on the network traffic flow prior to routing the network traffic flow to the destination cloud service(s) 108. For example, the first provider site 112(A)(1) may utilize the first firewall 120(A) to perform the one or more services on the network traffic flow prior to routing the network traffic flow to the destination cloud service 108.

In some examples, the SDN controller 106 and/or a user border 118 may determine to route a network traffic flow across regions/jurisdictions 110 based on the policy associated with the network traffic flow. For example, the SDN controller 106 may determine that the provider site(s) 112 (A) (or the regional firewall 120(A)) provisioned in the first region 110(A) of the SDA transit are unavailable and, based on the SGT and/or the DGT (e.g., the policy) associated with the network traffic flow, may identify a provider site 112(B) provisioned in the second region 110(B) of the SDA transit configured to provide the destination cloud service 108, and may route the network traffic flow from the first user site 112(A)(1) in the first region 110(A) to a provider site 112(B)(1), 112(B)(2) in the second region 110(B) to provide access to the destination cloud service 108 via the corresponding regional firewall 120(B). Additionally, or alternatively, the SDN controller 106 may transmit the SGT associated with a user device in a user site 116(A)(2) and the DGT associated with the destination service to a user border 118(A)(2) which may determine whether or not to route the network traffic flow to a provider border 112(B) in a different region 110 based on the SGT and/or the DGT. For example, a second user border 118(B)(3) associated with the user site 116(A)(2) in the first region 110(A) may be configured to route the network traffic flow to a provider site 112(B) in the second region 110(B).

The SDN controller 106 and/or a user border 116 may also determine to drop packets associated with the network traffic flow when it is determined that the providers site(s) 112 provisioned in the same region 110 of the SDA transit as the first user site 112(A)(1) (e.g., the source) are unavailable. For example, the policy (indicated by the SGT and/or the DGT) may be configured such that network traffic flows originating from a particular user site 116 and/or destined for a particular destination cloud service 108 may only be routed through the same region/jurisdiction 110. As such, the SDN controller 106 may determine to drop packets associated with the network traffic flow. Additionally, or alternatively, the SDN controller 106 may transmit the SGT associated with the user device in the user site 116 and the DGT associated with the destination service to the user border 118 which may determine whether or not to drop the packet based on the SGT and/or the DGT.

Figure 2:
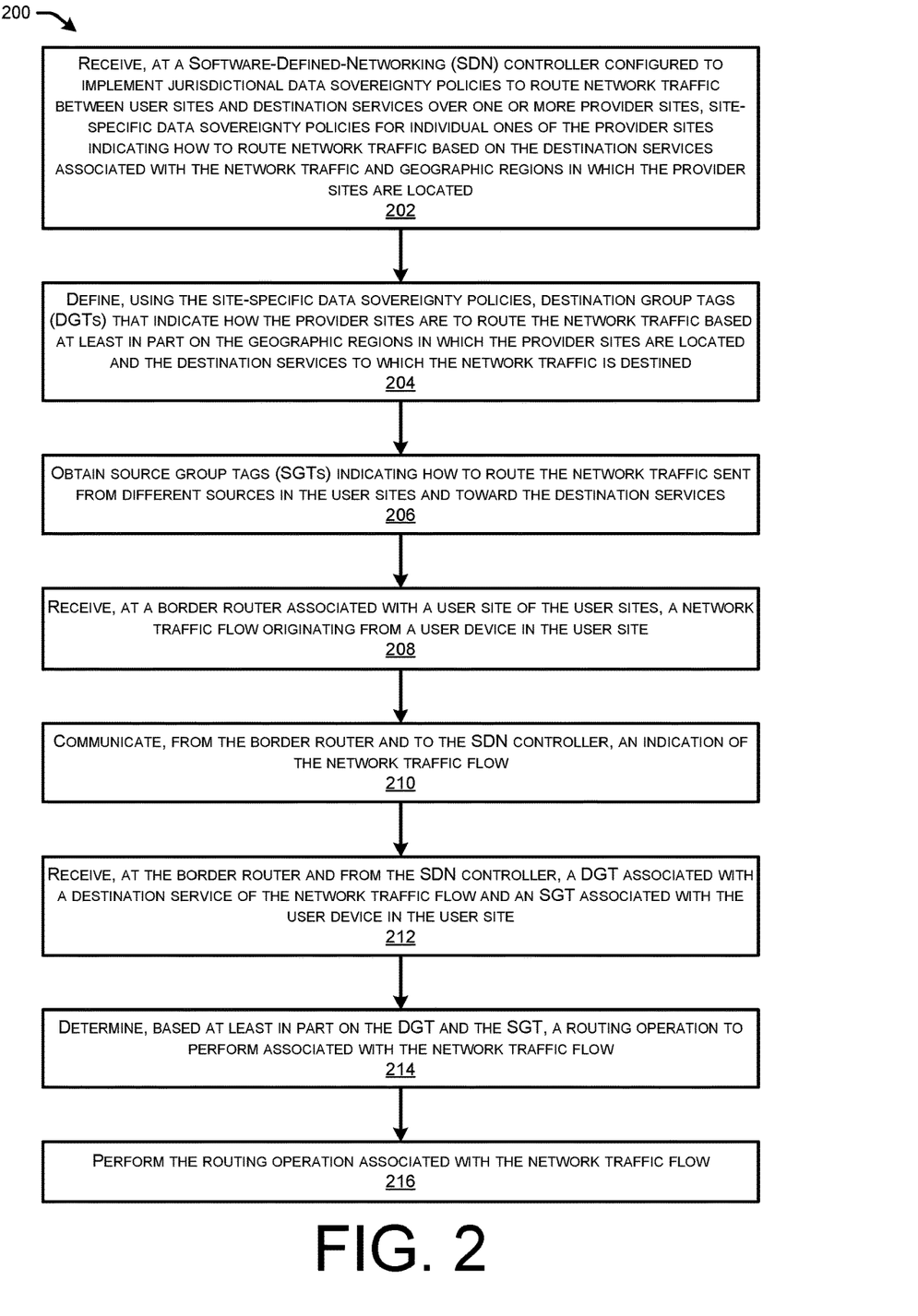
FIG. 2 illustrates a flow diagram of an example method for a Software-Defined Networking (SDN) controller to implement jurisdictional data sovereignty polices, based on destination group tags (DGTs) and/or source group tags (SGTs), route network traffic flows between user sites and destination services over one or more provider sites and/or perform a routing operation on the network traffic flow(s) based on the jurisdictional data sovereignty policies.
Figure 3:
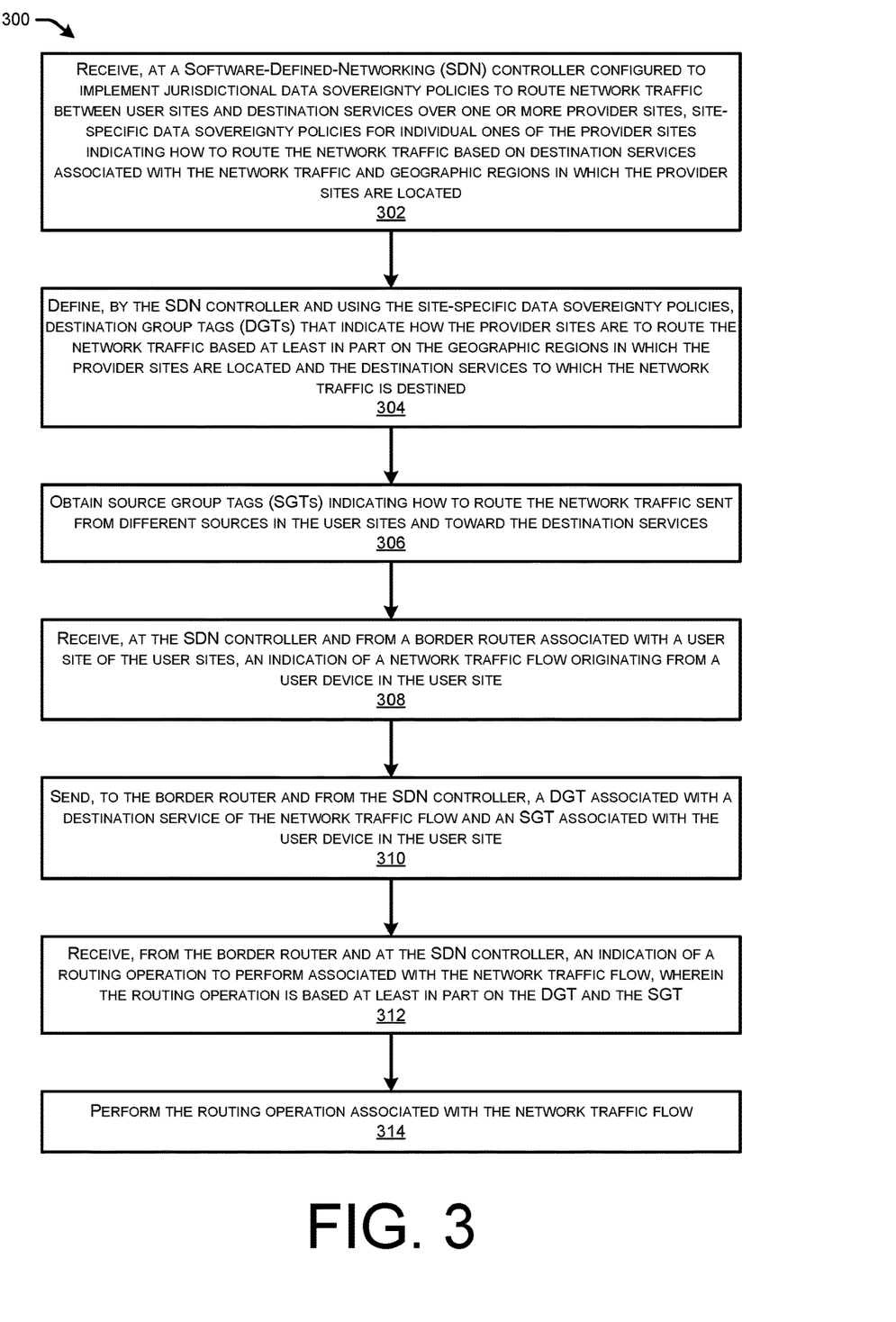
FIG. 3 illustrates a flow diagram of another example method for a Software-Defined Networking (SDN) controller to implement jurisdictional data sovereignty polices, based on destination group tags (DGTs) and/or source group tags (SGTs), route network traffic flows between user sites and destination services over one or more provider sites and/or perform a routing operation on the network traffic flow(s) based on the jurisdictional data sovereignty policies.

FIGS. 2 and 3 illustrate flow diagrams of example methods 200 and 300 and that illustrate aspects of the functions performed at least partly by the computing resource network 102, the provider border(s) 112, the user border(s) 116, the SASE 104, and/or the network controller 106 as described in FIG. 1. The logical operations described herein with respect to FIGS. 2 and 3 may be implemented (1) as a sequence of computer-implemented acts or program modules running on a computing system and/or (2) as interconnected machine logic circuits or circuit modules within the computing system. In some examples, the method(s) 200 and/or 300 may be performed by a system comprising one or more processors and one or more non-transitory computer-readable media storing computer-executable instructions that, when executed by the one or more processors, cause the one or more processors to perform the method(s) 200 and/or 300.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in the FIGS. 2 and 3 and described herein. These operations can also be performed in parallel, or in a different order than those described herein. Some or all of these operations can also be performed by components other than those specifically identified. Although the techniques described in this disclosure is with reference to specific components, in other examples, the techniques may be implemented by less components, more components, different components, or any configuration of components.

FIG. 2 illustrates a flow diagram of an example method 200 for a Software-Defined Networking (SDN) controller associated with a multisite network to implement jurisdictional data sovereignty polices, based on destination group tags (DGTs) and/or source group tags (SGTs), route network traffic flows between user sites and destination services over one or more provider sites and/or perform a routing operation on the network traffic flow(s) based on the jurisdictional data sovereignty policies. In some examples, the method 200 may be performed at least partly by the SDN controller. In some examples, the multisite network, the provider sites, the user sites, the SDN controller, and/or the destination services may correspond to the computing resource network 102, the provider border(s) 112, the user border(s) 116, the network controller 106, and/or the cloud service 108 as described with respect to FIG. 1.

At 202, the method 200 includes receiving site-specific data sovereignty policies for individual ones of the provider sites. In some examples, the site-specific data sovereignty policies may indicate how to route the network traffic based on the destination services associated with the network traffic and/or geographic regions in which the provider sites are located. In some examples, the SDN controller may receive the site-specific data sovereignty policies from a SASE engine associated with the network. In some examples, the geographic regions and/or the SASE engine may correspond to the regions 110 and/or the SASE engine 104 as described with respect to FIG. 1.

At 204, the method 200 includes defining destination group tags (DGTs) that indicate how the provider sites are to route the network traffic based at least in part on the geographic regions in which the provider sites are located and/or the destination services to which the network traffic is destined. In some examples, the DGTs may be defined using the site-specific data sovereignty policies.

At 206, the method 200 includes obtaining source group tags (SGTs) indicating how to route the network traffic sent from different sources in the user sites and toward the destination services. In some examples, the SDN controller may receive the SGTs from the SASE engine.

At 208, the method 200 includes receiving a network traffic flow originating from a user device in the user site. In some examples, the network traffic flow may be received at a border router associated with a user site of the user sites.

At 210, the method 200 includes communicating an indication of the network traffic flow. In some examples, the indication of the network traffic flow may be communicated from the border router and to the SDN controller and/or the SDA transit.

At 212, the method 200 includes receiving a DGT associated with the destination service of the network traffic flow and/or an SGT associated with the user device in the user site. In some examples, the DGT and/or the SGT may be received at the border router and from the SDN controller.

At 214, the method 200 includes determining a routing operation to perform associated with the network traffic flow. In some examples, the routing operation may be performed based at least in part on the DGT and the SGT. In some examples, the SDN controller may determine the routing operation to perform. Additionally, or alternatively, the border router may determine the routing operation to perform.

At 216, the method 200 includes performing the routing operation associated with the network traffic flow. In some examples, the SDN controller may perform the routing operation associated with the network traffic flow. Additionally, or alternatively, the border router may perform the routing operation associated with the network traffic flow. In some examples, the routing operation may comprise routing the network traffic flow to a provider border in the same region as the border router, routing the network traffic flow to a provider border in a different region from the border router, and/or dropping one or more packets associated with the network traffic flow.

In some examples, obtaining the SGTs comprises receiving the SGTs from a secure access service edge (SASE) engine associated with the SDN controller.

In some examples, the user site may be associated with a first geographic region and/or first provider sites of the provider sites may be associated with the first geographic region. Additionally, or alternatively, the method 200 includes determining that the first provider sites are unavailable. In some examples, performing the routing operation comprises dropping the packet based at least in part on the first geographic region and the SGT associated with the user device.

In some examples, the user site may be associated with a first geographic region. Additionally, or alternatively, a first provider site of the provider sites may be associated with the first geographic region. Additionally, or alternatively, performing the routing operation comprises routing the network traffic flow to the first provider site associated with the destination service of the network traffic flow based at least in part on the first geographic region and the SGT associated with the user device.

Additionally, or alternatively, the method 200 includes determining a first proximity from the user site to the first provider site. Additionally, or alternatively, the method 200 includes determining a second proximity from the user site to a second provider site of the provider sites. In some examples, the second provider site may be associated with the first geographic region. Additionally, or alternatively, the method 200 includes determining that the first proximity is more favorable than the second proximity. In some examples, routing the network traffic flow to the first provider site may be based at least in part on the first proximity being more favorable than the second proximity.

Additionally, or alternatively, the method 200 includes determining a first geographic region associated with the first provider site. Additionally, or alternatively, the method 200 includes determining a second geographic region associated with a second provider site of the provider sites. In some examples, the second geographic region may be different from the first geographic region. Additionally, or alternatively, the method 200 includes determining that the first geographic region is more favorable than the second geographic region based at least in part on the SGT. In some examples, routing the network traffic flow to the first provider site may be based at least in part on the first geographic region being more favorable than the second geographic region. For example, region-specific access control techniques described herein may be implemented by determining a geographic region is more favorable than another based on the geographic region of a user site corresponding to the geographic region of the provider site.

Additionally, or alternatively, the method 200 includes determining one or more services to be applied to the network traffic flow. In some examples, the one or more services to be applied may be based at least in part on the SGT associated with the user site. Additionally, or alternatively, the routing operation comprises routing the network traffic flow to a provider site to apply the one or more services to the network traffic flow prior to routing the network traffic flow to the destination service. In some examples, the provider site may apply the one or more services to the network traffic flow via a regional firewall, such as, for example, the regional firewall(s) 120 as described with respect to FIG. 1.

FIG. 3 illustrates a flow diagram of another example method 300 for a Software-Defined Networking (SDN) controller to implement jurisdictional data sovereignty polices, based on destination group tags (DGTs) and/or source group tags (SGTs), route network traffic flows between user sites and destination services over one or more provider sites and/or perform a routing operation on the network traffic flow(s) based on the jurisdictional data sovereignty policies.

At 302, the method 300 includes receiving site-specific data sovereignty policies for individual ones of the provider sites indicating how to route the network traffic based on destination services associated with the network traffic and/or geographic regions in which the provider sites are located. In some examples, the site-specific data sovereignty policies may be received at a Software-Defined-Networking (SDN) controller configured to implement jurisdictional data sovereignty policies to route network traffic between user sites and destination services over one or more provider sites. In some examples, the SDN controller may receive the site-specific data sovereignty policies from a SASE engine associated with the network. In some examples, the geographic regions and/or the SASE engine may correspond to the regions 110 and/or the SASE engine 104 as described with respect to FIG. 1.

At 304, the method 300 includes defining destination group tags (DGTs) that indicate how the provider sites are to route the network traffic based at least in part on the geographic regions in which the provider sites are located and/or the destination services to which the network traffic is destined. In some examples, the DGTs may be defined by the SDN controller and/or using the site-specific data sovereignty policies.

At 306, the method 300 includes obtaining source group tags (SGTs) indicating how to route the network traffic sent from different sources in the user sites and toward the destination services. In some examples, the SDN controller may receive the SGTs from the SASE engine.

At 308, the method 300 includes receiving an indication of a network traffic flow originating from a user device in the user site. In some examples, the indication of the network traffic flow may be received at the SDN controller and from a border router associated with a user site of the user sites.

At 310, the method 300 includes sending a DGT associated with the destination service of the network traffic flow and an SGT associated with the user device in the user site. In some examples, the DGT may be sent to the border router and from the SDN controller.

At 312, the method 300 includes receiving an indication of a routing operation to perform associated with the network traffic flow. In some examples, the routing operation is based at least in part on the DGT and the SGT. Additionally, or alternatively, the indication may be received from the border router and at the SDN controller.

At 314, the method 300 includes performing the routing operation associated with the network traffic flow. In some examples, the routing operation may comprise routing the network traffic flow to a provider border in the same region as the border router, routing the network traffic flow to a provider border in a different region from the border router, and/or dropping one or more packets associated with the network traffic flow.

Additionally, or alternatively, the method 300 includes receiving, at the border router associated with the user site and from the user device in the user site, the network traffic flow.

In some examples, obtaining the SGTs comprises receiving the SGTs from a secure access service edge (SASE) engine associated with the SDN controller.

Additionally, or alternatively, the method 300 includes determining, based at least in part on the SGT associated with the user site, one or more services to be applied to the network traffic flow. In some examples, the routing operation comprises routing the network traffic flow to a provider site to apply the one or more services to the network traffic flow prior to routing the network traffic flow to the destination service.

In some examples, the user site may be associated with a first geographic region and/or first provider sites of the provider sites may be associated with the first geographic region. Additionally, or alternatively, the method 300 includes determining that the first provider sites are unavailable. In some examples, performing the routing operation comprises dropping the packet based at least in part on the first geographic region and the SGT associated with the user device.

In some examples, the user site may be associated with a first geographic region. Additionally, or alternatively, a first provider site of the provider sites may be associated with the first geographic region. Additionally, or alternatively, performing the routing operation comprises routing the network traffic flow to the first provider site associated with the destination service of the network traffic flow based at least in part on the first geographic region and the SGT associated with the user device.

Figure 4:
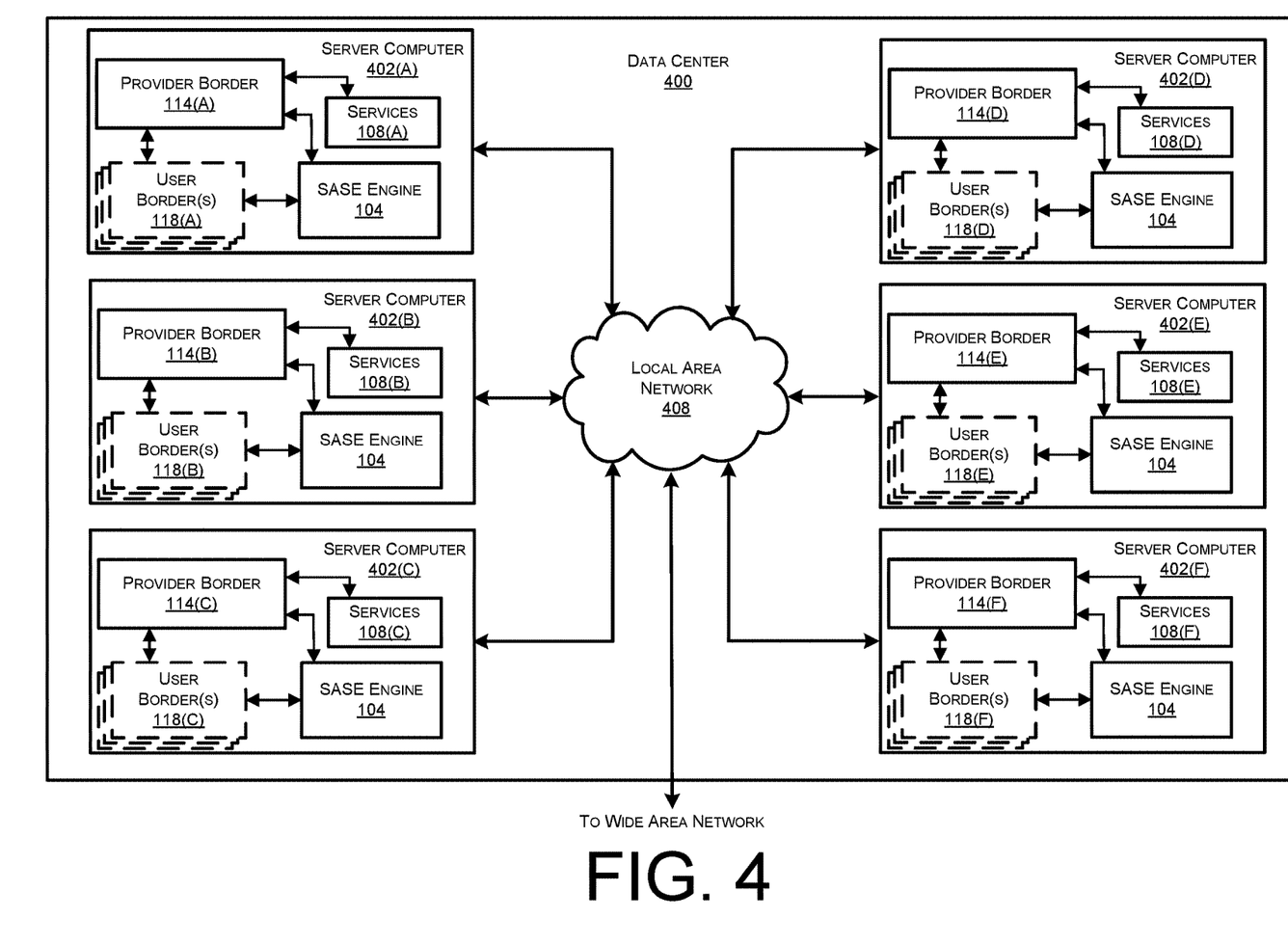
FIG. 4 illustrates a computing system diagram illustrating a configuration for a data center that can be utilized to implement aspects of the technologies disclosed herein.

FIG. 4 is a computing system diagram illustrating a configuration for a data center 400 that can be utilized to implement aspects of the technologies disclosed herein. The example data center 400 shown in FIG. 4 includes several server computers 402A-402E (which might be referred to herein singularly as "a server computer 402" or in the plural as "the server computers 402") for providing computing resources. In some examples, the server computers 402 may include, or correspond to, servers associated with a data center described herein with respect to FIG. 1.

The server computers 402 can be standard tower, rack-mount, or blade server computers configured appropriately for providing the computing resources described herein. As mentioned above, the computing resources provided by the computing resource network 102 can be data processing resources such as VM instances or hardware computing systems, database clusters, computing clusters, storage clusters, data storage resources, database resources, networking resources, and others. Some of the servers 402 can also be configured to execute a resource manager capable of instantiating and/or managing the computing resources. In the case of VM instances, for example, the resource manager can be a hypervisor or another type of program configured to enable the execution of multiple VM instances on a single server computer 402. Server computers 402 in the data center 400 can also be configured to provide network services and other types of services.

In the example data center 400 shown in FIG. 4, an appropriate LAN 408 is also utilized to interconnect the server computers 402A-402E. It should be appreciated that the configuration and network topology described herein has been greatly simplified and that many more computing systems, software components, networks, and networking devices can be utilized to interconnect the various computing systems disclosed herein and to provide the functionality described above. Appropriate load balancing devices or other types of network infrastructure components can also be utilized for balancing a load between data centers 400, between each of the server computers 402A-402E in each data center 400, and, potentially, between computing resources in each of the server computers 402. It should be appreciated that the configuration of the data center 400 described with reference to FIG. 4 is merely illustrative and that other implementations can be utilized.

In some examples, the server computers 402 may each execute one or more networking devices associated with a provider site 112, such as, for example, a provider border 114, one or more network devices associated with a user site 116, such as, for example, a user border 118, the cloud services 108, the SASE 104, and/or the network controller 106.

In some instances, the computing resource network 102 may provide computing resources, like application containers, VM instances, and storage, on a permanent or an as-needed basis. Among other types of functionality, the computing resources provided by the computing resource network 102 may be utilized to implement the various services described above. The computing resources provided by the computing resource network 102 can include various types of computing resources, such as data processing resources like application containers and VM instances, data storage resources, networking resources, data communication resources, network services, and the like.

Each type of computing resource provided by the computing resource network 102 can be general-purpose or can be available in a number of specific configurations. For example, data processing resources can be available as physical computers or VM instances in a number of different configurations. The VM instances can be configured to execute applications, including web servers, application servers, media servers, database servers, some or all of the network services described above, and/or other types of programs. Data storage resources can include file storage devices, block storage devices, and the like. The computing resources network 102 can also be configured to provide other types of computing resources not mentioned specifically herein.

The computing resources provided by the computing resource network 102 may be enabled in one embodiment by one or more data centers 400 (which might be referred to herein singularly as "a data center 400" or in the plural as "the data centers 400"). The data centers 400 are facilities utilized to house and operate computer systems and associated components. The data centers 400 typically include redundant and backup power, communications, cooling, and security systems. The data centers 400 can also be located in geographically disparate locations. One illustrative embodiment for a data center 400 that can be utilized to implement the technologies disclosed herein will be described below with regard to FIG. 5.

Figure 5:
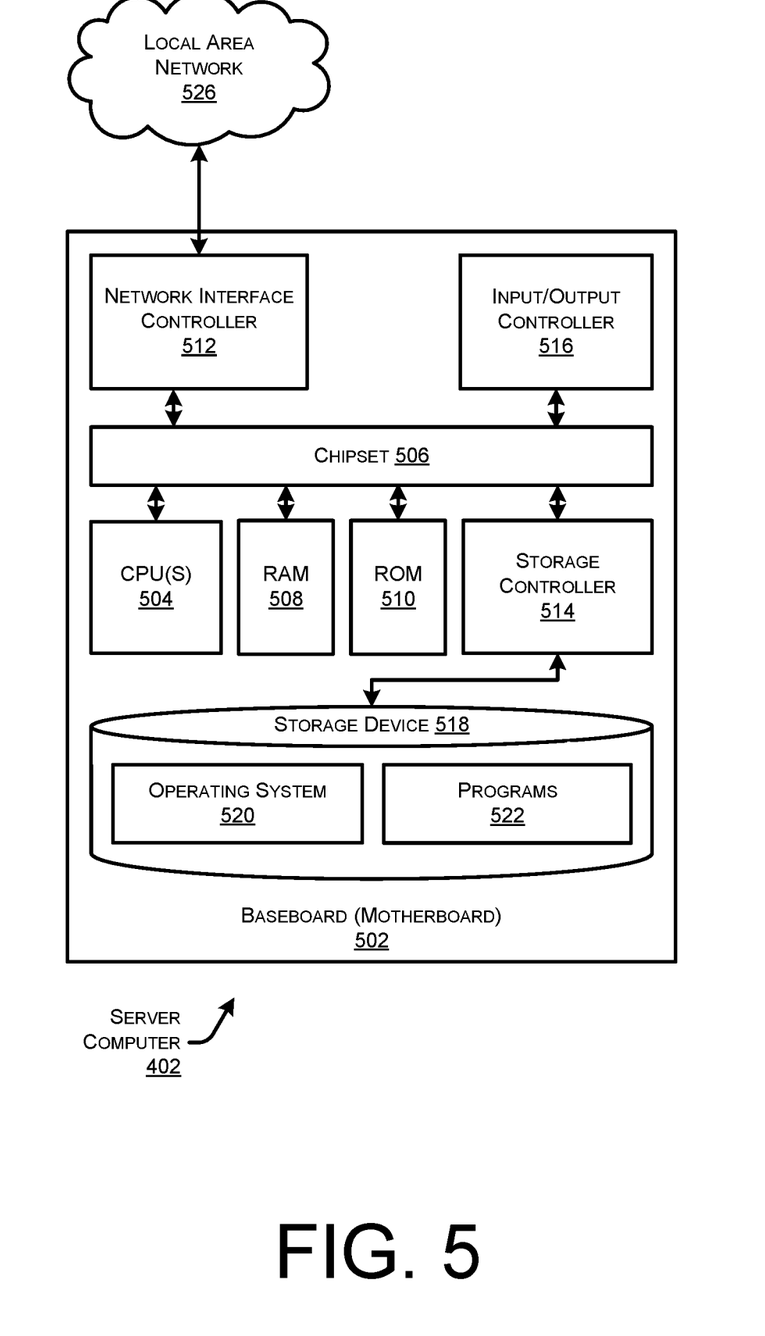
FIG. 5 is a computer architecture diagram showing an illustrative computer hardware architecture for implementing a server device that can be utilized to implement aspects of the various technologies presented herein.

FIG. 5 shows an example computer architecture for a computing device (or network routing device) 402 capable of executing program components for implementing the functionality described above. The computer architecture shown in FIG. 6 illustrates a conventional server computer, workstation, desktop computer, laptop, tablet, network appliance, e-reader, smartphone, or other computing device, and can be utilized to execute any of the software components presented herein. The computing device 402 may, in some examples, correspond to a physical server of a data center described herein with respect to FIG. 1.

The computing device 402 includes a baseboard 502, or "motherboard," which is a printed circuit board to which a multitude of components or devices can be connected by way of a system bus or other electrical communication paths. In one illustrative configuration, one or more central processing units ("CPUs") 504 operate in conjunction with a chipset 506. The CPUs 504 can be standard programmable processors that perform arithmetic and logical operations necessary for the operation of the computing device 402.

The CPUs 504 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 506 provides an interface between the CPUs 504 and the remainder of the components and devices on the baseboard 502. The chipset 506 can provide an interface to a RAM 508, used as the main memory in the computing device 402. The chipset 506 can further provide an interface to a computer-readable storage medium such as a read-only memory ("ROM") 510 or non-volatile RAM ("NVRAM") for storing basic routines that help to startup the computing device 402 and to transfer information between the various components and devices. The ROM 510 or NVRAM can also store other software components necessary for the operation of the computing device 402 in accordance with the configurations described herein.

The computing device 402 can operate in a networked environment using logical connections to remote computing devices and computer systems through a network, such as the network 526. The chipset 506 can include functionality for providing network connectivity through a NIC 512, such as a gigabit Ethernet adapter. The NIC 512 is capable of connecting the computing device 402 to other computing devices over the network 526. It should be appreciated that multiple NICs 512 can be present in the computing device 402, connecting the computer to other types of networks and remote computer systems.

The computing device 402 can be connected to a storage device 518 that provides non-volatile storage for the computing device 402. The storage device 518 can store an operating system 520, programs 522, and data, which have been described in greater detail herein. The storage device 518 can be connected to the computing device 402 through a storage controller 514 connected to the chipset 506. The storage device 518 can consist of one or more physical storage units. The storage controller 514 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computing device 402 can store data on the storage device 518 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 518 is characterized as primary or secondary storage, and the like.

For example, the computing device 402 can store information to the storage device 518 by issuing instructions through the storage controller 514 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computing device 402 can further read information from the storage device 518 by detecting the physical states or characteristics of one or more particular locations within the physical storage units.

In addition to the mass storage device 518 described above, the computing device 402 can have access to other computer-readable storage media to store and retrieve information, such as program modules, data structures, or other data. It should be appreciated by those skilled in the art that computer-readable storage media is any available media that provides for the non-transitory storage of data and that can be accessed by the computing device 402. In some examples, the operations performed by the computing resource network 102, and or any components included therein, may be supported by one or more devices similar to computing device 402. Stated otherwise, some or all of the operations performed by the computing resource network 102, and or any components included therein, may be performed by one or more computing device 402 operating in a cloud-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 518 can store an operating system 520 utilized to control the operation of the computing device 402. According to one embodiment, the operating system comprises the LINUX operating system. According to another embodiment, the operating system comprises the WINDOWS® SERVER operating system from MICROSOFT Corporation of Redmond, Washington. According to further embodiments, the operating system can comprise the UNIX operating system or one of its variants. It should be appreciated that other operating systems can also be utilized. The storage device 518 can store other system or application programs and data utilized by the computing device 402.

In one embodiment, the storage device 518 or other computer-readable storage media is encoded with computer-executable instructions which, when loaded into the computing device 402, transform the computer from a general-purpose computing system into a special-purpose computer capable of implementing the embodiments described herein. These computer-executable instructions transform the computing device 402 by specifying how the CPUs 504 transition between states, as described above. According to one embodiment, the computing device 402 has access to computer-readable storage media storing computer-executable instructions which, when executed by the computing device 402, perform the various processes described above with regard to FIGS. 1-3. The computing device 402 can also include computer-readable storage media having instructions stored thereupon for performing any of the other computer-implemented operations described herein.

The computing device 402 can also include one or more input/output controllers 516 for receiving and processing input from a number of input devices, such as a keyboard, a mouse, a touchpad, a touch screen, an electronic stylus, or other type of input device. Similarly, an input/output controller 516 can provide output to a display, such as a computer monitor, a flat-panel display, a digital projector, a printer, or other type of output device. It will be appreciated that the computing device 402 might not include all of the components shown in FIG. 5, can include other components that are not explicitly shown in FIG. 5, or might utilize an architecture completely different than that shown in FIG. 5.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method performed at least partly by a Software-Defined-Networking (SDN) controller for implementing jurisdictional data sovereignty policies to route network traffic between user sites and destination services over one or more provider sites, comprising:
   receiving site-specific data sovereignty policies for individual ones of the provider sites indicating how to route the network traffic based on the destination services associated with the network traffic and geographic regions in which the provider sites are located;
   defining, using the site-specific data sovereignty policies, destination group tags (DGTs) that indicate how the provider sites are to route the network traffic based at least in part on the geographic regions in which the provider sites are located and the destination services to which the network traffic is destined;
   obtaining source group tags (SGTs) indicating how to route the network traffic sent from different sources in the user sites and toward the destination services;
   receiving, at a border router associated with a user site of the user sites, a network traffic flow originating from a user device in the user site;
   communicating, from the border router and to the SDN controller, an indication of the network traffic flow;
   receiving, at the border router and from the SDN controller, a DGT associated with a destination service of the network traffic flow and an SGT associated with the user device in the user site;
   determining, based at least in part on the DGT and the SGT, a routing operation to perform associated with the network traffic flow; and
   performing the routing operation associated with the network traffic flow.

2. The method of claim 1, wherein obtaining the SGTs comprises receiving the SGTs from a secure access service edge (SASE) engine associated with the SDN controller.

3. The method of claim 1, wherein the user site is associated with a first geographic region and first provider sites of the provider sites are associated with the first geographic region, and the method further comprising:
   determining that the first provider sites are unavailable; and
   wherein performing the routing operation comprises dropping a packet based at least in part on the first geographic region and the SGT associated with the user device.

4. The method of claim 1, wherein:
   the user site is associated with a first geographic region;
   a first provider site of the provider sites is associated with the first geographic region; and
   performing the routing operation comprises routing the network traffic flow to the first provider site associated with the destination service of the network traffic flow based at least in part on the first geographic region and the SGT associated with the user device.

5. The method of claim 4, further comprising:
   determining a first proximity from the user site to the first provider site;
   determining a second proximity from the user site to a second provider site of the provider sites, the second provider site being associated with the first geographic region; and
   determining that the first proximity is more favorable than the second proximity;
   wherein routing the network traffic flow to the first provider site is based at least in part on the first proximity being more favorable than the second proximity.

6. The method of claim 4, further comprising:
   determining a first geographic region associated with the first provider site;
   determining a second geographic region associated with a second provider site of the provider sites, the second geographic region being different from the first geographic region; and
   determining that the first geographic region is more favorable than the second geographic region based at least in part on the SGT;
   wherein routing the network traffic flow to the first provider site is based at least in part on the first geographic region being more favorable than the second geographic region.

7. The method of claim 1, further comprising:
   determining, based at least in part on the SGT associated with the user site, one or more services to be applied to the network traffic flow;
   wherein the routing operation comprises routing the network traffic flow to a provider site to apply the one or more services to the network traffic flow prior to routing the network traffic flow to the destination service.

8. One or more non-transitory computer-readable media storing instructions executable by a processor, wherein the instructions, when executed, cause the processor to perform operations comprising:
   receiving, at a Software-Defined-Networking (SDN) controller configured to implement jurisdictional data sovereignty policies to route network traffic between user sites and destination services over one or more provider sites, site-specific data sovereignty policies for individual ones of the provider sites indicating how to route network traffic based on the destination services associated with the network traffic and geographic regions in which the provider sites are located;
   defining, using the site-specific data sovereignty policies, destination group tags (DGTs) that indicate how the provider sites are to route the network traffic based at least in part on the geographic regions in which the provider sites are located and the destination services to which the network traffic is destined;
   obtaining source group tags (SGTs) indicating how to route the network traffic sent from different sources in the user sites and toward the destination services;
   receiving, at a border router associated with a user site of the user sites, a network traffic flow originating from a user device in the user site;
   communicating, from the border router and to the SDN controller, an indication of the network traffic flow;
   receiving, at the border router and from the SDN controller, a DGT associated with a destination service of the network traffic flow and an SGT associated with the user device in the user site;

determining, based at least in part on the DGT and the SGT, a routing operation to perform associated with the network traffic flow; and performing the routing operation associated with the network traffic flow.

9. The one or more non-transitory computer-readable media of claim 8, wherein obtaining the SGTs comprises receiving the SGTs from a identity service engine (ISE) associated with the SDN controller.

10. The one or more non-transitory computer-readable media of claim 8, wherein the user site is associated with a first geographic region and first provider sites of the provider sites are associated with the first geographic region, and the operations further comprising:

determining that the first provider sites are unavailable; and wherein performing the routing operation comprises dropping a packet based at least in part on the first geographic region and the SGT associated with the user device.

11. The one or more non-transitory computer-readable media of claim 8, the operations further comprising:

determining, based at least in part on the SGT associated with the user site, one or more services to be applied to the network traffic flow;

wherein the routing operation comprises routing the network traffic flow to a provider site to apply the one or more services to the network traffic flow prior to routing the network traffic flow to the destination service.

12. The one or more non-transitory computer-readable media of claim 8, wherein:

the user site is associated with a first geographic region;

a first provider site of the provider sites is associated with the first geographic region; and performing the routing operation comprises routing the network traffic flow to the first provider site associated with the destination service of the network traffic flow based at least in part on the first geographic region and the SGT associated with the user device.

13. The one or more non-transitory computer-readable media of claim 12, the operations further comprising determining a first proximity from the user site to the first provider site;

determining a second proximity from the user site to a second provider site of the provider sites, the second provider site being associated with the first geographic region; and determining that the first proximity is more favorable than the second proximity;

wherein routing the network traffic flow to the first provider site is based at least in part on the first proximity being more favorable than the second proximity.

14. The one or more non-transitory computer-readable media of claim 12, the operations further comprising:

determining a first geographic region associated with the first provider site;

determining a second geographic region associated with a second provider site of the provider sites, the second geographic region being different from the first geographic region; and determining that the first geographic region is more favorable than the second geographic region based at least in part on the SGT;

wherein routing the network traffic flow to the first provider site is based at least in part on the first geographic region being more favorable than the second geographic region.

15. A method comprising:

receiving, at a Software-Defined-Networking (SDN) controller configured to implement jurisdictional data sovereignty policies to route network traffic between user sites and destination services over one or more provider sites, site-specific data sovereignty policies for individual ones of the provider sites indicating how to route the network traffic based on destination services associated with the network traffic and geographic regions in which the provider sites are located;

defining, by the SDN controller and using the site-specific data sovereignty policies, destination group tags (DGTs) that indicate how the provider sites are to route the network traffic based at least in part on the geographic regions in which the provider sites are located and the destination services to which the network traffic is destined;

obtaining source group tags (SGTs) indicating how to route the network traffic sent from different sources in the user sites and toward the destination services;

receiving, at the SDN controller and from a border router associated with a user site of the user sites, an indication of a network traffic flow originating from a user device in the user site;

sending, to the border router and from the SDN controller, a DGT associated with a destination service of the network traffic flow and an SGT associated with the user device in the user site;

receiving, from the border router and at the SDN controller, an indication of a routing operation to perform associated with the network traffic flow, wherein the routing operation is based at least in part on the DGT and the SGT; and performing the routing operation associated with the network traffic flow.

16. The method of claim 15, further comprising receiving, at the border router associated with the user site and from the user device in the user site, the network traffic flow.

17. The method of claim 15, wherein obtaining the SGTs comprises receiving the SGTs from a secure access service edge (SASE) engine associated with the SDN controller.

18. The method of claim 15, further comprising:

determining, based at least in part on the SGT associated with the user site, one or more services to be applied to the network traffic flow;

wherein the routing operation comprises routing the network traffic flow to a provider site to apply the one or more services to the network traffic flow prior to routing the network traffic flow to the destination service.

19. The method of claim 15, wherein the user site is associated with a first geographic region and first provider sites of the provider sites are associated with the first geographic region, and the method further comprising:

determining that the first provider sites are unavailable; and wherein performing the routing operation comprises dropping a packet based at least in part on the first geographic region and the SGT associated with the user device.

20. The method of claim 15, wherein:

the user site is associated with a first geographic region;

a first provider site of the provider sites is associated with the first geographic region; and performing the routing operation comprises routing the network traffic flow to the first provider site associated with the destination service of the network traffic flow based at least in part on the first geographic region and the SGT associated with the user device.

* * * * *